No. 741,547. PATENTED OCT. 13, 1903.
P. RENNER.
COFFEE COOKER.
APPLICATION FILED APR. 11, 1902.
NO MODEL.

Witnesses
Wm C Meyer
C. A. Lehmkuhl

Inventor
Peter Renner
By Murray & Murray
Attorneys

No. 741,547. Patented October 13, 1903.

UNITED STATES PATENT OFFICE.

PETER RENNER, OF CINCINNATI, OHIO.

COFFEE-COOKER.

SPECIFICATION forming part of Letters Patent No. 741,547, dated October 13, 1903.

Application filed April 11, 1902. Serial No. 102,354. (No model.)

*To all whom it may concern:*

Be it known that I, PETER RENNER, a citizen of the United States of America, and a resident of Cincinnati, in the county of Hamilton and State of Ohio, have invented certain new and useful Improvements in Coffee-Cookers, of which the following is a specification.

The object of my invention is a coffee-cooker which will float upon the liquid and hold the vessel in which the coffee-grounds are contained below the surface of the liquid and which prevents the aroma of the coffee from escaping. This object is attained by the means described in the specification and illustrated in the accompanying drawings, of which—

Figure 1:
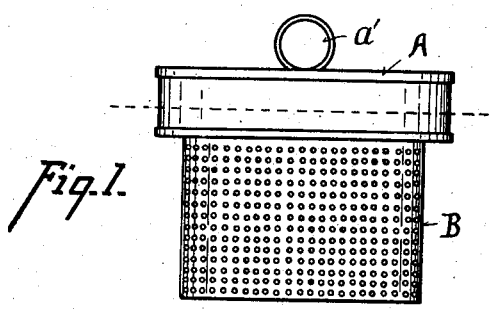
Figure 2:
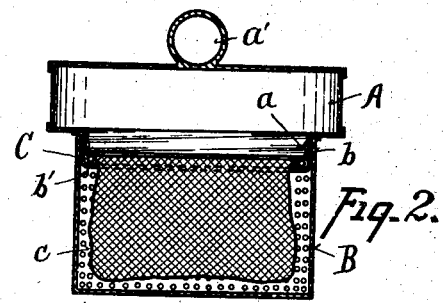
Figure 6:
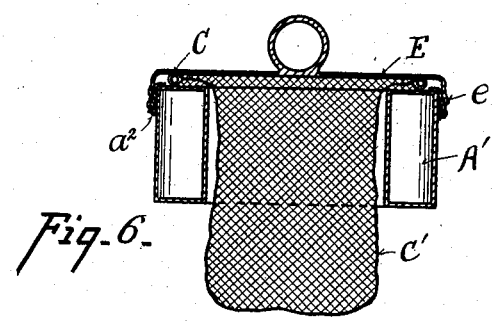
Figure 3:
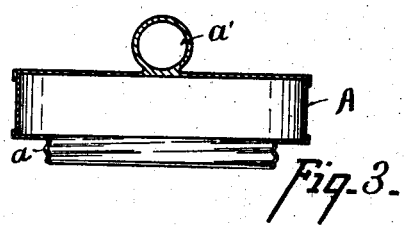
Figure 4:
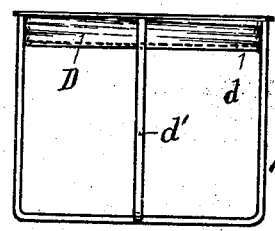
Figure 5:
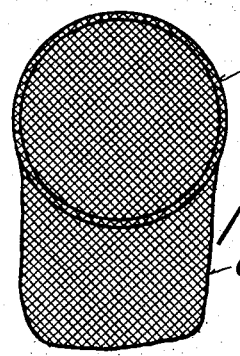

Figure 1 is a side elevation of a coffee-cooker embodying my invention. Fig. 2 is a central sectional view of the same. Fig. 3 is a detail central sectional view of the air-chamber with the receptacle for holding the coffee-grounds removed. Fig. 4 is a view in side elevation of the removable frame which is to be secured to the air-chamber for holding a sack and showing a modification. Fig. 5 is a perspective view of the sack. Fig. 6 is a central sectional view of a modified form of my invention which is to be used only with a sack.

Figs. 1 and 2 represent the preferred form, referring to the parts in which a floating vessel consists of a closed chamber A, having a downwardly-extending reduced cylindrical exteriorly-screw-threaded extension $a$, which engages the screw-threaded portion $b$ of the coffee-grounds receptacle B, which consists of a perforated vessel having below the screw-threaded portion an inwardly-extending flange $b'$. Flange $b'$ supports a ring C, to which is attached a canvas bag $c$. The canvas bag is to be used when the coffee is finely ground. When it is more coarsely ground, the bag may be omitted and the grounds held in the receptacle B. After the grounds have been placed within the receptacle and the receptacle has been engaged with the floating vessel the same are to be placed in any suitable vessel containing the water for making the coffee. The floating vessel will sink down in the water to a point indicated by dotted line in Fig. 1. Thus none of the aroma can escape into the air without going through the water. Vessel A has a handle $a'$ for removing it from the vessel containing the liquid when desired.

In Fig. 4 is illustrated a modification which is to be used with a canvas bag. It consists of a screw-threaded ring D, having an inwardly-projecting flange $d$ and downwardly-projecting spider-arms $d'$. Flange $d$ is to support the ring C, holding the bag C', and ring D is to engage the screw-threaded extension $a$. Bag C' may be formed of a coarser material than bag $c$ and is to be used without any surrounding vessel.

Fig. 6 is an illustration of another modified form. It consists in having floating vessel A' made in the shape of a hollow ring, which has at its upper end an exteriorly-screw-threaded portion $a^2$. Portion $a^2$ engages the downwardly-extending annular flange $e$ of the cover E. The ring C is to be placed upon the top of vessel A'. The bag C' extends downwardly through the ring A', and cover E is placed upon the vessel A', which holds the bag securely in place and prevents any of the aroma escaping from the coffee-grounds when the vessel is placed in the water.

What I claim is—

1. In a coffee-cooker, a closed air-chamber, a perforated receptacle, a flexible, pervious sack within said perforated receptacle, and means for attaching said receptacle to the under side of the chamber so as to catch and hold the upper edge of the sack between said receptacle and chamber.

2. In a coffee-cooker, a closed air-chamber, a screw-threaded offset on the under side thereof, a member adapted to engage said offset having an inwardly-turned flange, a pervious receptacle for the coffee adapted to be engaged at its upper edge and held in place against the under side of the chamber by the inwardly-turned flange.

3. In a coffee-cooker, a closed air-chamber having a screw-threaded portion, and adapted to cause the coffee-cooker to float; a flexible pervious sack adapted to hold the coffee; a screw-threaded member adapted to engage the screw-threads on the chamber so as to lock the upper edges of the sack between the chamber and said member and close the mouth of the sack.

4. In a coffee-cooker, a closed chamber having a screw-threaded lower portion, and adapted to cause the coffee-cooker to float; a rigid perforated member having screw-threads adapted to engage the screw-threads of the chamber, an inwardly-turned flange, and a flexible pervious sack the upper edges of which are adapted to be engaged between the inwardly-turned flange and the bottom of the chamber to hold the sack in place and close the mouth thereof.

5. In a coffee-cooker, the combination of a closed air-chamber, having a downwardly-extending screw-threaded extension, a coffee-receptacle with a screw-threaded flange for engaging the same, substantially as shown and described.

6. In a coffee-cooker, the combination of a closed air-chamber, with a downwardly-extending screw-threaded extension, a coffee-receptacle with an upper screw-threaded flange for engaging said extension, and with an inwardly-projecting flange below said flange, a ring to rest upon the flange, and a coffee-sack supported by the ring, substantially as shown and described.

PETER RENNER.

Witnesses:
W. F. MURRAY,
C. A. LEHMKUHL.